United States Patent [19]

Spencer

[11] Patent Number: 4,906,826

[45] Date of Patent: Mar. 6, 1990

[54] USAGE PROMOTION METHOD FOR PAYMENT CARD TRANSACTION SYSTEM

[75] Inventor: Wyner Spencer, San Francisco, Calif.

[73] Assignee: Visa International Service Association, San Mateo, Calif.

[21] Appl. No.: 246,414

[22] Filed: Sep. 19, 1988

[51] Int. Cl.[4] .............................................. G06F 15/30

[52] U.S. Cl. .................................... 235/379; 235/380; 273/138 A; 273/1 E; 902/23

[58] Field of Search .................. 235/379, 380; 902/23; 273/138 A, 1 E

[56] References Cited

U.S. PATENT DOCUMENTS 4,815,741 3/1989 Small .............................. 273/138 A

OTHER PUBLICATIONS

Citibank Card Promotion Advertisement.

*Primary Examiner*—Harold I. Pitts

*Attorney, Agent, or Firm*—Limbach, Limbach & Sutton

[57] ABSTRACT

A usage promotion method for use with a payment card data interchange system in which a computer examines card transaction data files to select transactions conforming to specified criteria. The computer eliminates arbitrarily all but a fraction of the selected transactions, selects winning transactions by using the bytes of the computer's system clock, and produces a verifiable list of winning transactions which, after manual verification, are used to create credits to the accounts of the card holders of the winning transactions.

12 Claims, 2 Drawing Sheets

USAGE PROMOTION METHOD FOR PAYMENT CARD TRANSACTION SYSTEM

TECHNICAL FIELD

A usage promotion method is disclosed for use in association with a transaction card system. The method permits automatic selection of winning transactions and the generation of credits of the winning transaction amounts to the corresponding card holders' accounts.

BACKGROUND OF THE INVENTION

Payment card transaction systems desiring to increase usage of the system by card holders have recently begun giving awards to randomly selected payment card users during a predetermined time period. The method of implementing such usage promotion schemes must be compatible with the data processing capabilities of the transaction system and preferably should be automated to the greatest extent possible.

SUMMARY OF THE INVENTION

In accordance with these and many other objects, the subject invention provides, in a payment card data interchange system of the type which includes a central processor, card issuers, providers of goods or services, and data transfer lines which interconnect the central processor with the card issuers and the providers, a method for promoting payment card usage by automatically awarding credits to card holders in the amount of their purchases, on a random basis. The method of the invention comprises the steps of reading digital data representing an issuer data file containing information regarding all card issuers in the system, reading digital data representing a parameter library data file describing selected transaction parameters including transaction date periods, transaction amounts, and card issuers, reading digital data representing a transaction log data file of each transaction processed by the system, and comparing the digital data of the transaction log data file, the issuer data file and the parameter library data file to generate digital data representing a data file of all eligible transactions.

Thereafter the method further includes the steps of selecting digital data corresponding to every Nth transaction, where N is a selected integer, to generate digital data representing a reduced data file of eligible transactions, randomly selecting a first one of the transactions from the reduced data file of eligible transactions and then selecting every Mth transaction thereafter, where M is a randomly selected integer, to generate digital data representing a data file of potential winning transactions.

The potential winning transactions are thereafter verified and eliminated from the data file of potential winning transactions all unverified transactions. Via the data transfer lines, credit data corresponding to the verified winning transactions is sent to the issuers for posting to the corresponding card holders' accounts.

In a preferred embodiment of the invention, the step of reading digital data representing a transaction log data file of each transaction processed by the system further includes the step of reading digital data representing each transaction separately processed by each issuer bank. The central processor includes a system clock which sequentially generates time code signals in the form of multiple bytes of digital data and the step of randomly selecting the first one of the transactions from the reduced data file of eligible transactions comprises the steps of arbitrarily selecting a first one of the system clock bytes to determine the first transaction and then selecting a second one of the bytes to determine every Mth transaction thereafter.

Furthermore, in the method according to the preferred embodiment of the invention, the comparing step comprises selecting the digital data of the transaction log data file corresponding only to transactions occurring within a selected week and comparing said digital transaction data with the issuer data file and the parameter library data file to generate digital data representing a data file of all eligible weekly transactions. This step can be varied, such as by selecting the digital data of the transaction log data file corresponding only to transactions occurring within the first week of a selected month or only transactions occurring within each week of a selected month.

The step of randomly selecting transactions includes the step of totaling the amounts of each selected transaction and terminating the random selecting step when a predetermined total is reached. This step can further include the step of continuing to randomly select a predetermined of alternate transactions after the predetermined total is reached.

The foregoing and other objectives, features and advantages of the invention will be more readily understood upon consideration of the following detailed description of certain preferred embodiments of the invention, taken in conjunction with the accompanying drawings.

DETAILED DESCRIPTION OF THE PREFERRED EMBODIMENT

Figure 1:
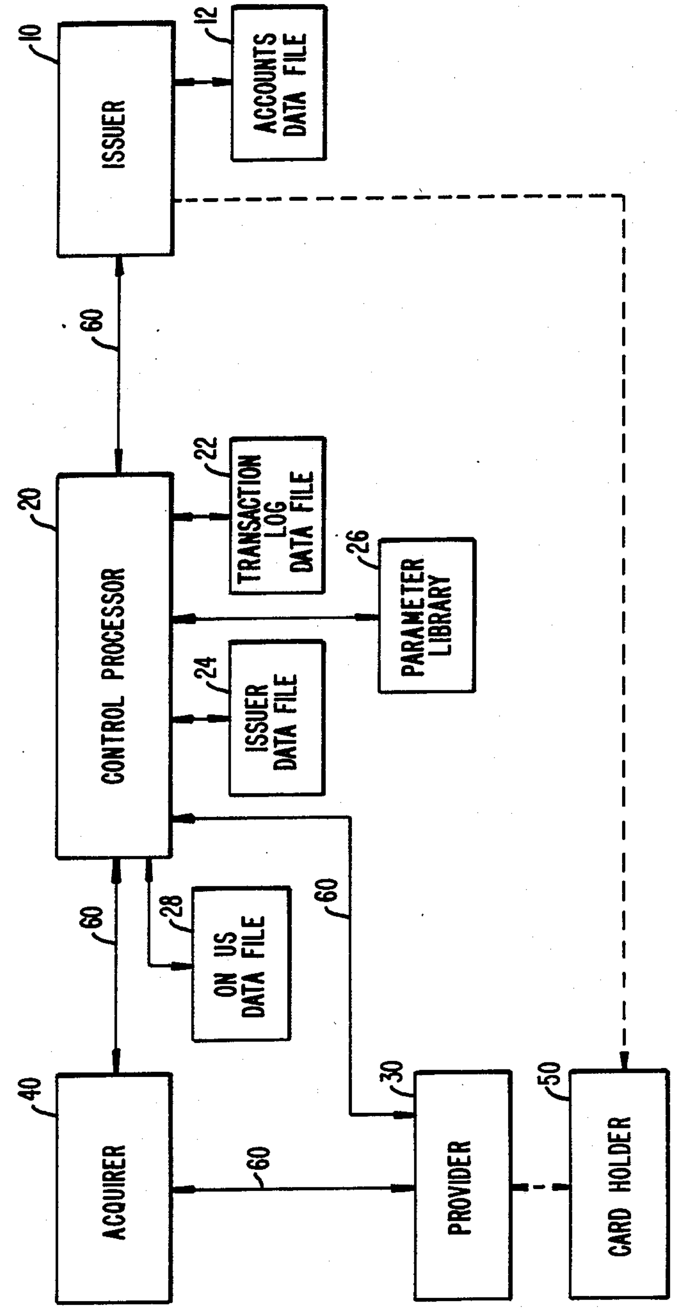
FIG. 1 is a schematic diagram of a transaction system which can be utilized for carrying out the payment method of the subject invention.

The subject invention is utilized in conjunction with a conventional transaction network to promote payment card usage within the transaction network. Referring to FIG. 1, the elements of the transaction card network and the modifications thereto are illustrated. A more detailed description of conventional transaction card networks can be found in U.S. Pat. No. 4,485,300, issued on Nov. 27, 1984 and U.S. Pat. No. 4,734,564, issued on Mar. 29, 1988, both assigned to the assignee of the subject invention and incorporated herein by reference.

As described in the above cited patents, transaction cards are typically supplied to card holders by financial institutions which may be generically referred to as issuers 10. Such payment cards could be either a credit card or a debit card, for example. A single issuer is shown for clarity in FIG. 1 but in a typical system, multiple issuers will exist. Each issuer maintains files 12 of all the accounts of its card member base. Each card is assigned an account number for tracking purposes and the card holder is billed by the issuer bank for transactions using his payment card.

Each of the issuers in the system is connected to a central processor 20. These connections are typically on data transfer lines 60. The transaction network typically includes a number of providers 30 who will accept transaction cards as a substitute for cash payment of goods or services. The central processor 20 provides a network node function, transferring information between providers 30 and the card issuers 10. In addition, the central processor 20 provides numerous intermediary tracking and processing functions and maintains a transaction log data file 22 of all transactions processed by it as well as an issuer data file 24, containing information regarding the issuers. A parameter library data file 26 is accessible by the central processor for running special programs, as will be explained in greater detail hereinafter. The parameter library data file 26 stores digital data which can be easily modified by the system operators to change or control certain operating features of programs being run by the central processor 20.

An entity known as a merchant member bank or acquirer 40, acts as an intermediary between the provider 30 and the rest of the network. Once again, there are typically a number of acquirers 40 in the system, each of which is responsible for a number of providers 30. The acquirer is responsible for paying the provider for submitted expenses.

Such payment card data interchange systems desire to promote usage of the system by card holders. Recently this has been accomplished by offering prizes or awards, including credits toward the card holder's bill, to randomly selected card holders who have used their cards within a defined time period. It is an object of the present invention to automate such a payment card sweepstakes promotion.

Figure 2:
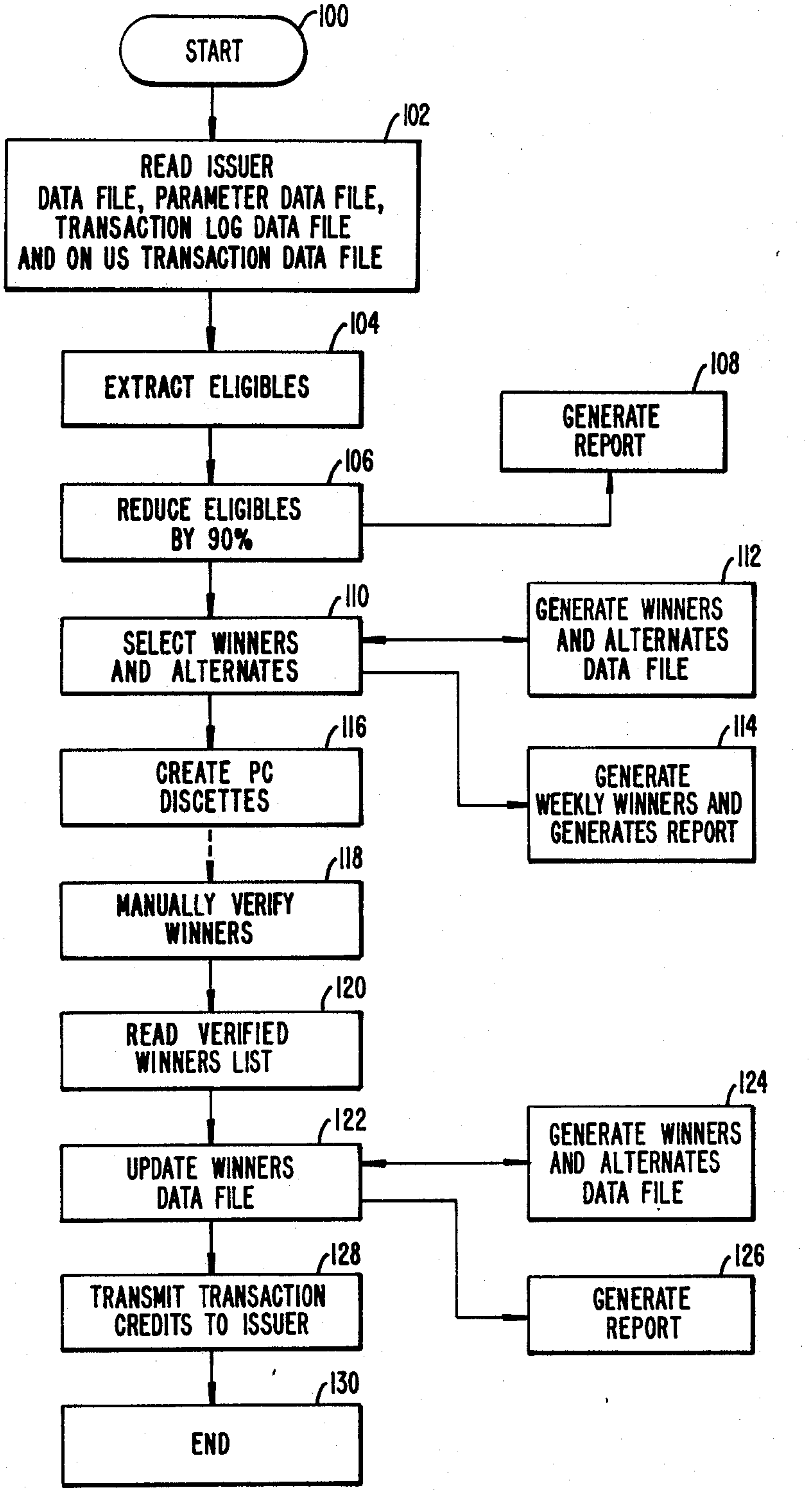
FIG. 2 is a flow-chart illustrating the steps which are carried out in the method of the subject invention.

Referring now to FIG. 2, a flow chart of a card usage promotion program according to the invention which is followed by the central processor ("CPU") 20 will be explained. The CPU 20 starts the program at step 100 and at step 102 it reads the digital data of the issuer data file 24 containing information regarding all card issuers in the system. It also reads the digital data of the parameter library data file 26 describing selected transaction parameters including transaction date periods, transaction amounts, and card issuers. The CPU 20 also reads the digital data of the transaction log data file of each transaction processed by the system. In some cases the provider 30 and the card holder use the same bank. For these transactions (referred to as "on us" transactions), the acquirer and issuer are the same and the transaction is not processed through the system but instead it is processed by the acquirer bank. A separate data file 28 of "on us" transactions is supplied to the CPU 20 which reads this data at step 102.

At step 104, the CPU 24 compares the digital data of the transaction log data file 22, the "on us" data file 28, the issuer data file 24 and the parameter library data file 26 to generate digital data representing a data file of all eligible transactions. In doing this the CPU 20 checks all transactions within specified date periods, using cards issued by specified issuers (e.g. excluding cards issued by foreign issuers), and for specified transaction amounts. The specified parameters are taken from the parameter library 26.

It is necessary to arbitrarily reduce the size of the eligible transaction list. Therefore, at step 106, the CPU 20 selects digital data corresponding to every Nth transaction, where N is a selected integer, to generate digital data representing a reduced data file of eligible transactions. For example, the CPU 20 selects every tenth transaction to reduce the list by 90%. Thereafter the CPU 20 proceeds to step 108 at which it generates a report, listing the number of transactions, the total dollar amount of those transactions and the average dollar amount of those transactions.

At step 110, the CPU 20 randomly selects a first one of the transactions from the reduced data file of eligible transactions and then selects every Mth transaction thereafter, where M is a randomly selected integer, to generate digital data representing a data file of potential winning transactions. The CPU 20 includes a system clock (not shown) which sequentially generates time code signals in the form of multiple bytes of digital data. The step of randomly selecting the first one of the transactions from the reduced data file of eligible transactions comprises the steps of arbitrarily selecting a first one of the system clock bytes to determine the first transaction and then selecting a second one of the bytes to determine every Mth transaction thereafter.

This step of randomly selecting winning transactions includes the step of totaling the amounts of each selected transaction and terminating the random selecting step when a predetermined total is reached. Preferably the CPU 20 continues to randomly select a predetermined number of alternate transactions after the predetermined total is reached.

Furthermore, in the CPU 20 according to a preferred embodiment of the invention, the winner selection step 110 can comprise selecting the digital data of the transaction log data file 22 corresponding only to transactions occurring within a selected week and comparing this digital transaction data with the issuer data file 24, the "on us" data file 28 and the parameter library data file 26 to generate digital data representing a data file of all eligible weekly transactions. This step can be varied, such as by selecting the digital data of the transaction log data file 22 corresponding only to transactions occurring within the first week of a selected month or only transactions occurring within each week of a selected month. In fact, all of these selection processes can proceed concurrently to allow weekly and monthly "bonus" winners to be selected.

A data file of potential winning transactions and alternates is generated by the CPU 20 at step 112 and a weekly winners and alternates report is generated at a step 114. A copy of this list is downloaded to a convenient form for manual verification, such as on to a personal computer diskette at step 116.

The potential winning transactions are thereafter verified manually at step 118. This step is accomplished by contacting the potential winners to secure signed statements of compliance with the contest's rules, for example. Thereafter, all unverified transactions are eliminated from the data file of potential winning transactions by reading back into the CPU 20 a list of the verified, winning transactions (or winning alternate transactions, if necessary) at step 120 and at step 122 the winners data file is updated to include only the winning transactions. New corresponding data files and reports are generated at steps 124 and 126, respectively.

Via the data transfer lines, credit data corresponding to the verified winning transactions is sent to the issuers for posting to the corresponding card holders' accounts at step 128. That is, each corresponding card holder is credited with the amount of his or her winning transaction. In the case of bonus winners, the CPU 24 credits the winning card holder with the total of the transactions from the previous month's statement. The program ends at step 130.

While the subject invention has been described with reference to a preferred embodiment, additional changes and modifications could be made therein by one skilled in the art, without varying from the scope and spirit of the subject invention as defined by the claims appended hereto.

What is claimed is:

1. In a payment card data interchange system of the type which includes a central processor, card issuers, providers of goods or services, and data transfer lines which interconnect the central processor with the card issuers and the providers, a method for promoting payment card usage by automatically awarding credits to card holders in the amount of their purchases, on a random basis, which comprises the steps of:

a. reading digital data representing an issuer data file containing information regarding all card issuers in the system;

b. reading digital data representing a parameter library data file describing selected transaction parameters;

c. reading digital data representing a transaction log data file of each transaction processed by the system;

d. comparing the digital data of the transaction log data file, the issuer data file and the parameter library data file to generate digital data representing a data file of all eligible transactions;

e. reducing the number of eligible transactions to generate digital data representing a reduced data file of eligible transactions; and f. randomly selecting transactions from the reduced data file of eligible transactions to generate digital data representing a data file of potential winning transactions.

2. A method of usage promotion for use in conjunction with a payment card data interchange system as recited in claim 1, further comprising the steps of:

g. verifying the potential winning transactions and eliminating from the data file of potential winning transactions all unverified transactions;

h. sending to the issuers, via the data transfer lines, credit data corresponding to the verified winning transactions for posting to the corresponding card holders' accounts.

3. A method of usage promotion for use in conjunction with a payment card data interchange system as recited in claim 1, wherein the step of reading the digital data representing a parameter library data file includes reading digital data representing transaction date periods, transaction amounts, and card issuers.

4. A method of usage promotion for use in conjunction with a payment card data interchange system as recited in claim 1, wherein the step of reducing the data file of eligible transactions includes the steps of selecting every Nth transaction, where N is a selected integer, to generate the digital data representing the reduced data file of eligible transactions.

5. A method of usage promotion for use in conjunction with a payment card data interchange system as recited in claim 1, wherein the step of randomly selecting transactions includes the steps of randomly selecting a first one of the transactions from the reduced data file of eligible transactions and then selecting every Mth transaction thereafter, where M is a randomly selected integer, to generate digital data representing a data file of potential winning transactions.

6. A method of usage promotion for use in conjunction with a payment card data interchange system as recited in claim 5 wherein the central processor includes a system clock which sequentially generates time code signals in the form of multiple bytes of digital data and the step of randomly selecting the first one of the transactions from the reduced data file of eligible transactions comprises the steps of arbitrarily selecting a first one of the system clock bytes to determine the first transaction and then selecting a second one of the bytes to determine every Mth transaction thereafter.

7. A method of usage promotion for use in conjunction with a payment card data interchange system as recited in claim 1, wherein the step of reading digital data representing a transaction log data file of each transaction processed by the system further includes the step of reading digital data representing each transaction separately processed by each issuer bank.

8. A method of usage promotion for use in conjunction with a payment card data interchange system as recited in claim 1, wherein the comparing step comprises selecting the digital data of the transaction log data file corresponding only to transactions occurring within a selected week and comparing said digital transaction data with the issuer data file and the parameter library data file to generate digital data representing a data file of all eligible weekly transactions.

9. A method of usage promotion for use in conjunction with a payment card data interchange system as recited in claim 1, wherein the comparing step comprises selecting the digital data of the transaction log data file corresponding only to transactions occurring within the first week of a selected month and comparing said digital transaction data with the issuer data file and the parameter library data file to generate digital data representing a data file of all eligible weekly bonus transactions.

10. A method of usage promotion for use in conjunction with a payment card data interchange system as recited in claim 1, wherein the comparing step comprises sequentially selecting the digital data of the transaction log data file corresponding only to transactions occurring within each week of a selected month and comparing said digital transaction data with the issuer data file and the parameter library data file to generate digital data representing a data file of all eligible monthly bonus transactions.

11. A method of usage promotion for use in conjunction with a payment card data interchange system as recited in claim 1 wherein the step of randomly selecting transactions includes the step of totaling the amounts of each selected transaction and terminating the random selecting step when a predetermined total is reached.

12. A method of usage promotion for use in conjunction with a payment card data interchange system as recited in claim 11 wherein the step of randomly selecting transactions includes the further step of continuing to randomly select a predetermined of alternate transactions after the predetermined total is reached.

* * * * *